(12) United States Patent
McGarel et al.

(10) Patent No.: US 9,348,343 B2
(45) Date of Patent: May 24, 2016

(54) BULK MATERIAL BLENDING CONTROL

(75) Inventors: Steven J. McGarel, Austin, TX (US); Manoel Augusto Morales do Nascimento, Rio Grande do Sul (BR)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 689 days.

(21) Appl. No.: 12/238,903

(22) Filed: Sep. 26, 2008

(65) Prior Publication Data

US 2010/0082157 A1    Apr. 1, 2010

(51) Int. Cl.
G05B 21/00    (2006.01)
G05D 11/13    (2006.01)
G05B 13/04    (2006.01)

(52) U.S. Cl.
CPC ............ *G05D 11/132* (2013.01); *G05B 13/048* (2013.01)

(58) Field of Classification Search
USPC ........... 700/28–33, 36, 44, 45, 49, 51, 52, 68, 700/99, 106, 108–109, 239, 240, 265, 266, 700/274, 285; 366/8, 16–21, 152.1–152.4
See application file for complete search history.

(56) References Cited

U.S. PATENT DOCUMENTS

| 4,395,290 | A | | 7/1983 | Oller et al. |
| 4,971,077 | A | * | 11/1990 | Dominguez ........... A24B 15/30 131/108 |
| 5,766,297 | A | * | 6/1998 | Piniecki ................. C04B 7/153 65/141 |
| 6,033,102 | A | * | 3/2000 | Morihira et al. .................. 366/8 |
| 6,113,256 | A | | 9/2000 | Bonissone et al. |
| 6,120,172 | A | | 9/2000 | Chen et al. |
| 6,120,173 | A | | 9/2000 | Bonissone et al. |
| 6,668,201 | B1 | | 12/2003 | Bonissone et al. |
| 7,308,339 | B2 | | 12/2007 | Bonissone et al. |
| 2004/0138765 | A1 | | 7/2004 | Bonissone |
| 2005/0132933 | A1 | | 6/2005 | Blum |
| 2005/0223633 | A1 | * | 10/2005 | Sankaranarayanan .......... 44/629 |
| 2007/0064762 | A1 | | 3/2007 | Hammerling |

* cited by examiner

*Primary Examiner* — Sean Shechtman
(74) *Attorney, Agent, or Firm* — Fletcher Yoder P.C.

(57) ABSTRACT

A technique is disclosed for controlling a material blending process for blending a plurality of raw material feeds using model predictive control in order to produce a blended product conforming to one or more quality standards. The quality standards may be based upon control variables derived from relationships and/or ratios of certain materials in the composition of the raw material feeds (e.g., moduli). The determined control variables are compared to desired set points and, if a deviation from the desired set points is detected, the proportions of the raw material feeds are adjusted to align the control variables with the desired set points. The technique may further take material cost factors into account, wherein the prediction model determines a proper proportioning of the raw material feeds such that the blended product conforms to the desired specifications and is produced for the lowest cost.

28 Claims, 5 Drawing Sheets

FIG. 5 though manual control of the blending process based on a determined moduli relationship may be achieved, such control does not take cost optimization con-
BULK MATERIAL BLENDING CONTROL

BACKGROUND

Embodiments of the present invention relate generally to process control techniques. More particularly, embodiments of the present invention relate to dynamic model predictive control and optimization of bulk material blending processes.

Bulk material blending generally refers to a process in which multiple material streams are mixed to create a particular blended product for storage, stockpiling, or downstream processing. By way of example, bulk material blending techniques may be applicable to the manufacture of a number of blended materials across different industries, such as cement blending (e.g., both raw mix and clinker mix), coal blending, as well as other various mineral and/or liquid blending processes.

A frequent challenge that may arise in any bulk material blending process is controlling and maintaining the stability of the raw material chemistry in creating the blended product. To provide one example using a competitive market, such as the cement market, one challenge may be to produce cement conforming to certain quality specifications while using the lowest cost materials. Accordingly, plant and quarry management decisions, weather conditions, as well as material delivery logistics, can impose long term chemistry variations in the overall material blending process. For instance, it may not always be feasible to extract the best limestone (e.g., having a high purity or concentration of calcium carbonate ($CaCO_3$)) due to limitations regarding either cost or logistics. Rather, in some instances, to obtain a desired amount of a particular desired material, it may be necessary or even more cost effective to transport and/or extract the desired material from bulk materials having a lower concentration of the desired material.

Further, throughout the material blending process, it may be necessary to maintain the average of the raw material chemistry in as stable a manner as possible while maintaining the production of a blended product that satisfies one or more desired quality specifications. For example, referring back to the cement manufacturing example discussed above, certain applicable quality standards implemented with regard to the raw mix of cement materials may be intended to minimize the total heat consumption, and thus overall energy requirements, for clinkering, as well as ensure that the resulting blended material is within product specifications. Additionally, unstable chemistry that fails to conform to these quality standards may lead to unstable kiln operation for clinkering, as well as produce a product that fails to meet certain quality guidelines, and thus may meet industry standards with respect to product specifications.

Historically, engineers at blending plants and quarries have attempted to manually control the proportioning set points for raw feed materials and/or the feed rates of the raw materials to meet certain quality parameters. In some instances, these quality parameters may be based on maintaining certain desired relationships and ratios between one or more materials in the blending process. Such material relationships may be referred to as "moduli." However, there may be a mathematically infinite number of solutions to satisfy requirements for the one or more desired moduli. Thus, engineers and operators often resort to on-site trial and error in adjusting the proportioning set points of raw material feeds to produce a product that is in conformance with one or more desired moduli. Further, even if manual control of the blending process based on a determined moduli relationship may be achieved, such control does not take cost optimization considerations into account. Accordingly, to effectively control the material chemistry in a material blending process while taking raw material cost into account, an improved technique for controlling material blending processes to reduce the overall deviations from a particular quality target is needed.

BRIEF DESCRIPTION

In general, the present technique provides a control system adapted for controlling the proportioning set points of feed materials in a material blending process. The technique may be used in any suitable material blending process, including those used in the manufacture of cement and coal products, as well as any other blended mineral-based or liquid-based raw or intermediate material or product.

The basis for such control system designs may include parametric models, neural network models, linear and non-linear models, to name only a few. In one presently contemplated embodiment, a model predictive control (MPC) system may provide a blending control application configured to adjust the proportioning of set points of the raw material chemistry for the blended product. For instance, the process may involve the periodic adjustment of percentage proportions of each individual feed materials based on an estimation of chemical and or other quality composition as compared to actual quality analysis input to the system using either laboratory testing or online analysis, with the goal being that the adjusted proportions for the feed materials provide a total feed rate of all materials. For instance, where the proportions are adjusted based on percentage set points, the total feed may be viewed as a constraint, wherein the control system must ensure that the adjusted proportioning percentage set points total to 100%.

The blending control system may include an inferential model (e.g., a virtual sensor) which may be used to calculate estimated target properties, such as certain proportional relationships and/or ratios between various feed materials in the blending process. The blending control system may further include a dynamic predictive model to generate control actions based on the target properties, such as by generating control outputs for adjusting the proportioning of the raw material feeds. The provided blending application may further take cost considerations into account. For example, the present technique may consider individual material costs, which may include mining, extraction, and/or transport costs, in order to satisfy blending targets while optimizing (e.g., minimize) production costs.

Additionally, further features provided in accordance with the present technique may include monitoring of incoming material feed streams and compensating for deviations between an actual and desired set point. For example, the technique may allow for compensation of chemical deviations due to impurities and/or additional compositions within the raw material feed, such as water/moisture and oxides content. For instance, online analyzers or laboratory testing results may be provided to determine an actual composition of a desired component within a material feed. Thus, the input data to the virtual sensor for determining target properties may be biased to reflect the actual compositions of the raw material feeds, which may be determined either separately or as a combined stream.

In certain embodiments, the technique may also be adapted to tolerate larger deviations from a desired set point and from various output quality targets (e.g., moduli) for a programmed time period prior to incorporating compensation actions in order to reach the required quality targets. The present technique may further include status detection and or alarm mechanisms which may be used to terminate control and/or halt the blending process is necessary, such as, for example, in the event that one or more material feeds are disrupted, either due to a physical fault upstream in the process, or due to a manual stopping of equipment.

Overall, the application of the techniques described herein may thus advantageously provide for the effective control of a blending process in order to produce a blended product conforming to certain quality guidelines and, in certain embodiments, further provide for the minimization of product costs in producing the blended material product.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
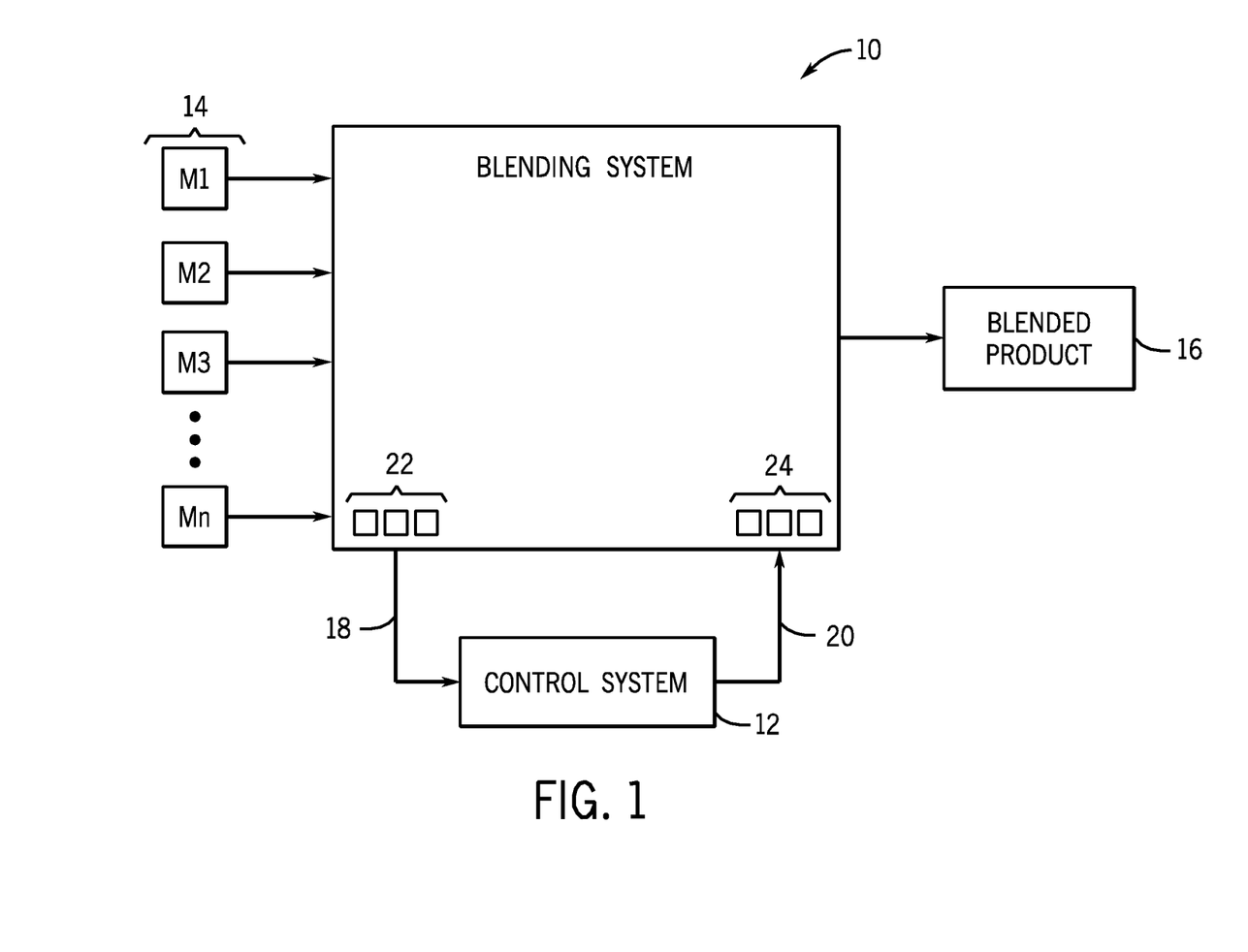
FIG. 1 is a diagrammatical representation of a material blending system equipped with a control system designed to implement the present technique.

Turning now to the drawings, and referring first to FIG. 1, a material blending system 10 is illustrated that is at least partially regulated by a control system 12. As mentioned above, the material blending system 10 may be applicable to any conceivable type of blending process, including cement, coal, mineral, and liquid blending processes, to name just a few. In general, the blending system 10 will receive one or more inputs 14, which may constitute a plurality of raw material feeds, designated here by M1, M2, M3, and Mn. These material feeds may be combined by the blending system 10 to produce a final blended product output 16, which may be stored, stockpiled, or provided to additional systems for downstream processing. Based upon the system dynamics, the physics of the system and similar factors, the control system 12, may regulate operations of the blending system 10 to control both the production and quality of the resulting blended product 16.

In the embodiment illustrated in FIG. 1, the control system 12 may output signals representing control functions 20 in response to process information 18 received from the blending system 10. For instance, process information 18 may be provided by one or more sensors 22 configured to detect and/or measure certain parameters of the blending system 10, which may include measurements representative of both manipulated variables (MV's) and control variables (CV's). In general, such sensors 22 may include measurement devices, transducers, and the like that may produce discrete or analog signals and values representative of variables of the process system. Such sensors 22 commonly produce voltage or current outputs that are representative of the sensed variables. The process information 18 may also include controllable and external operating constraints, as well as user-specified set points, for example.

The sensors 22 may be coupled to one or more controllers of the control system 12. In practice, many such sensors and more than one controller may be provided in the control system 12, as will be discussed below. Thus, based on the data provided by the sensors 22, the control system 12 may determine the control actions or functions 20, which may then be provided to one or more actuators 24 that serve to alter portions of the blending system 10 in order to regulate the blended product output 16. In general, such actuators 24 may include, by way of example only, valves, motors, position devices, pumps, and so forth. The sensors 22 may be generally considered to provide signals representative of measured values of process variables. These measured values again, may be analog or digital signals or values, and may be measured directly by the sensors, or in certain applications may be derived from certain measured values.

As one skilled in the art will appreciate, based upon certain measured values, the control system 12 or other signal processing circuitry may develop or derive values for certain system parameters based upon a predictive control model, which may define mathematical relationships between the measured values and those desired parameters. Such inference may be particularly useful where control is desired based upon particular system parameters that are impossible or difficult to detect. The present technique for model predictive control may thus employ virtual sensors, such as a Virtual Online Analyzer® (VOA) available from Pavilion Technologies, Inc., of Austin, Tex., that effectively operate as a sensor by differentially determining certain desired variables for control purposes. For instance, in an exemplary embodiment, the control system 12 may be adapted to control the proportioning of the raw material feeds based on estimated quality targets derived using one or more virtual sensors and based on various relationships with regard to the compositions of the raw materials provided. The control system 12 may then determine the appropriate control action or actions to implement in the blending system 10 in order to produce a blended product output that, for example, conforms to certain target quality parameters. Further, in some embodiments, the control actions may be determined using a dynamic predictive model which may not only be adapted to control quality targets, but may also take cost considerations (e.g., based on a cost function) into account, as will be discussed further below.

Figure 2:
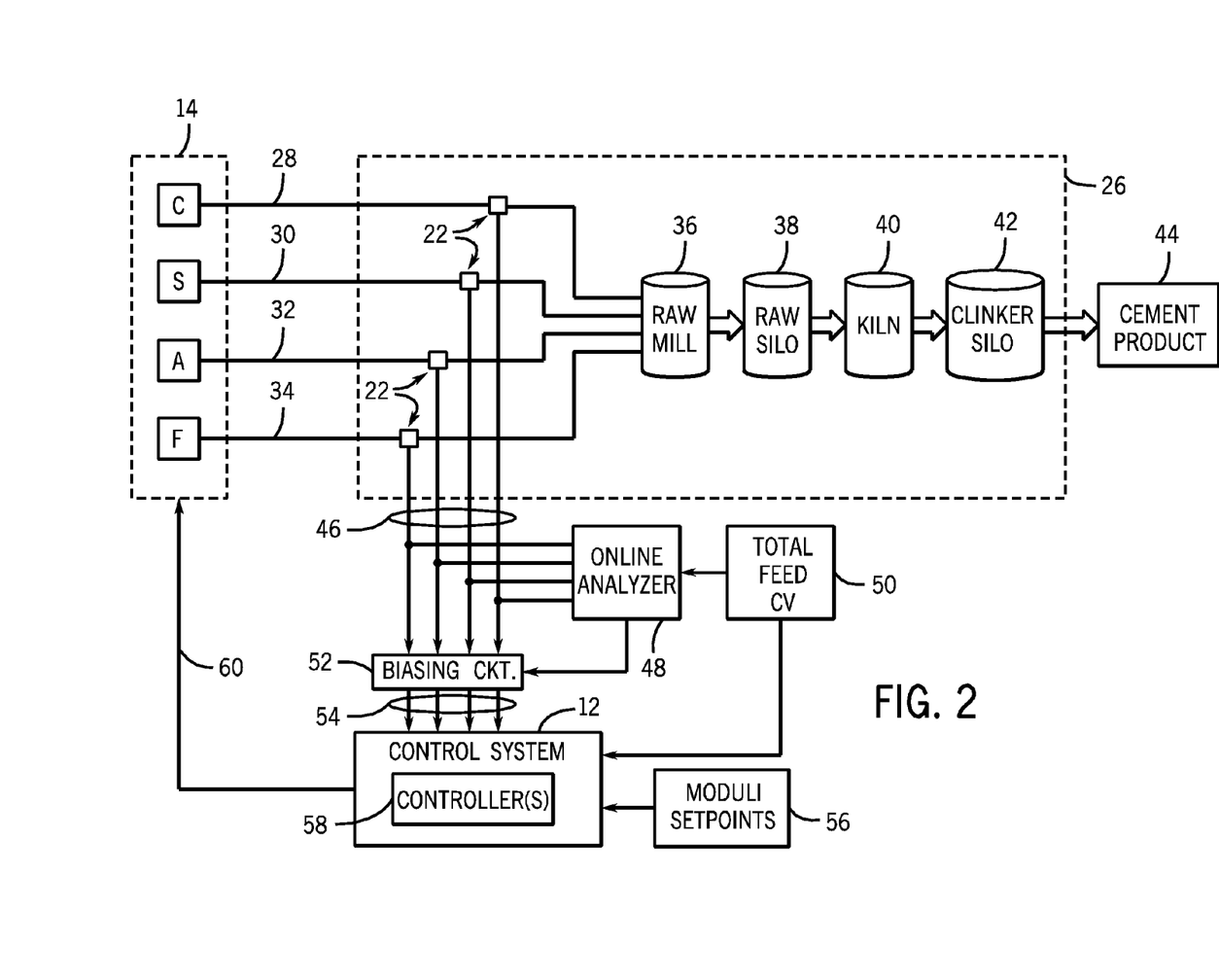
FIG. 2 is a diagrammatical representation of a material blending system for producing a cement product and including a control system having one or more controllers in accordance with an embodiment of the present invention.

As mentioned above, the present techniques may be particularly applicable to a cement manufacturing process, as shown in FIG. 2 and generally designated by the reference numeral 26. It should be understood, however, that the present technique is not intended to be limited to a cement process. Here, the cement blending system 26 may be adapted to produce a cement product, such as Portland cement (e.g., European Standard EN197.1), and receive the above-mentioned raw material feed inputs 14 including a first material having a calcium oxide (CaO) component, a second material having a silicon dioxide component ($SiO_2$), a third material having an aluminum oxide component ($Al_2O_3$), and a fourth material having a an iron oxide component ($Fe_2O_3$), as shown here by the feeds C, S, A, and F, respectively. It should be noted that the aforementioned abbreviations (C, S, A, and F) are standard and commonly used in the cement industry, and thus will be utilized through the present disclosure where relevant. Further, as will be appreciated, the raw material inputs 14 may not necessarily provide the C, S, A, and F materials in a pure form. In practice, each of the required C, S, A, and F oxide containing materials are typically quarried or mined from local rock or minerals containing various amounts of the C, S, A, and F oxide components, while some may contain only one of these components. By way of example, C, which may be a primary component in cement manufacturing, may be derived from limestone (e.g., calcium carbonate, $CaCO_3$). Thus it should be understood that each of the material feeds designated as C, S, A, and F, are meant to indicate a raw material containing the corresponding required oxide component, and may not necessarily represent the pure oxide material itself.

The raw materials containing the required oxide components for cement manufacturing may be transported to the cement blending system 26 by way of one or more transport mechanisms, represented here by the reference numerals 28, 30, 32, and 34, which may include, for example, various transport mechanisms including conveyers and belts. In practice, each of the C, S, A, and F oxide containing materials 14 may be provided by silos arranged over a respective transport mechanism (e.g., 28, 30, 32, and 34). As shown in the present figure, the raw material inputs 14 may be provided to a raw mill unit 36 by the transport mechanisms 28, 30, 32, and 34, in which the raw materials may be ground into a raw mix and passed to the raw mix silo 38. The fineness of the raw mix material may be specific to each particular implementation. For example, the milling process may be controlled such that less than 15% of the mass of particles in the resulting mix exceed a diameter of 90 μm. As will be appreciated, achieving a specific fineness or granulometry of the raw mix material may be desirable in order to ensure that desired chemical reactions occur within the kiln 40 as the raw mix material from the raw mix silo 38 is heated in the kiln 40 for the production of clinker. In practice, the peak temperature in the kiln may peak at or exceed 1400 degrees Celsius. The high temperature may cause a succession of chemical reactions to occur, thus producing cement clinker. The cement clinker may be stored in the clinker silo 42, pending additional processing prior to creating the final cement product 44. For instance, additional processing steps may include finely grinding the clinker to form the finished cement powder, and may also include the addition of additive materials, such as calcium sulfates (e.g., gypsum) and extender materials (e.g. limestone, slag, pulverized fly ash, pozzolanic materials, etc.) which may influence the rate at which the cement product 44 sets and strengthens. The present technique is also applicable to the blending of these materials with clinker to produce cement products to applicable industry specifications.

As shown in FIG. 2, the cement blending system 26 may be controlled by the control system 12. As discussed above, the control system 12 may be adapted to control the proportioning of the C, S, A, and F raw material feeds based on estimated quality targets which may be determined using one or more VOA's. In a presently contemplated embodiment, the sensors 22 may be coupled to each of the feed transport mechanisms 28, 30, 32, and 34 to determine the material compositions of each raw material with respect to a total feed of all the raw material inputs 14. For instance, the present flow of each material feed (e.g., tons/hour) may be measured by the sensors 22 to derive data (e.g., a percentage) regarding the composition of the raw oxide-containing materials, as indicated by the reference number 46, with respect to a total feed control variable. As discussed above, however, while each feeder may provide a raw material containing a desired oxide component, these raw materials may contain additional elements and impurities. Thus, it may be necessary to compensate for chemical deviations due to impurities and/or additional compositions that may be present within the raw material feed, such as water/moisture content, other oxides, and trace materials, for instance. In certain implementations, as will be discussed further below, the raw material chemical analysis information detailing the composition of each raw material and material routing information detailing which materials are being fed on which feeder or feeders (e.g., 28, 30, 32, and 34) may be provided to the control system 12, such that if a material is feed on more than one feeder, the control system 12 may properly control the proportioning of the raw material feeds using the correct feeder or feeders.

In the illustrated embodiment, an online analyzer 48 is provided and may be configured to determine an actual composition of a desired component within a material feed. For instance, the online analyzer 48 may utilize near infrared, prompt gamma neutron activation analysis (PGNAA), controlled neutron analysis, X-ray fluorescence or X-ray diffraction, and may operate in conjunction with the sensors 22 in order to provide data to the control system 12 reflecting the actual composition of the oxide components C, S, A, and F in the feeds. For instance, the online analyzer 48 may be configured to measure and/or detect and determine an actual amount of the C, S, A, and F oxides in the raw material feeds, or to detect for impurities (e.g., other non-required oxides) and moisture content in the material feeds that may be used to derive the actual oxide compositions. Based on these observations, the online analyzer 48 may take into account the total feed rate of the raw materials 14, referred to here by the reference numeral 50, in order to determine the proportional percentage of each oxide being received by the cement blending system 26. Accordingly, the measured oxide compositions may be output from the online analyzer 48 and used to bias the composition data obtained by the sensors 22, such as by way of the biasing circuit 52. That is, the material composition data 46 determined by the sensors 22 may be adjusted to reflect the actual oxide composition in each of the raw material feeds 14. These biased values 54 may then be provided to the control system 12. In practice, due to the high costs of online analyzer devices, raw material feeds may be analyzed as a combined stream of material feeds (e.g., as opposed to separate streams) using a single online analyzer. Thus, based on the combined stream of input materials, the online analyzer 48 may be configured to extrapolate composition information relating to the target oxide materials based upon the analysis of the combined stream. Further, in certain blending processes where exotic, hazardous, or very expensive materials (e.g., relative to other blending materials) are required, multiple online analyzers may be implemented to analyze the separate individual feed or feeds of the exotic, hazardous, or expensive materials, as well as a combined stream of all the blended materials.

Though not shown in the present figure, it should be appreciated that additional raw material feeds for providing lesser amounts of additive materials may also be present in a cement blending process 26. Such additive materials, which may include various other oxides, such as magnesium oxides, manganese oxides, titanium oxides, sulfur oxides, etc., may be reflected as providing certain qualities and characteristics in a blended cement product 44. These additional oxides generally make up a relatively small portion (e.g., 1-10%) of the total composition of the raw mix, and thus have not been discussed herein. That is, the C, S, A, and F oxide materials constitute a substantial portion of the raw cement mix and is the focus of the control techniques set forth in the present disclosure. It should be noted though, that the control techniques described herein may also be applicable to the above-discussed additive materials. Additionally, it should be noted that in a further embodiment, the material compositions may be determined using laboratory testing results based on analyzing a sample of each material feed in a laboratory setting, as opposed to using the online analyzer.

As shown here, the control system 12 may include a controller 58, which may be an MPC controller implementing one or more dynamic predictive models adapted to control the cement production process based upon the received inputs 54 and 56. As discussed above, the control system 12 may be adapted to control the quality of the cement product 44 produced by the cement production process 26 by adjusting the proportions of the raw material feeds 14 based on one or more "moduli" targets which, as summarized above, may represent certain desirable material relationships between one or more of the raw material components, such as particular relationships between the C, S, A, and F oxides. For instance, one or more desired moduli set points 56 may be provided to the control system 12, and the controller 58 may be configured to implement control actions 60 to drive the dynamics of the cement blending process 26 based on the material composition data 54 in order to meet the desired moduli set points 56. Again, it should be noted that the control actions 60 may implement control to adjust the proportioning set points (e.g., in percentages) of the raw material feeds 14.

Figure 3:
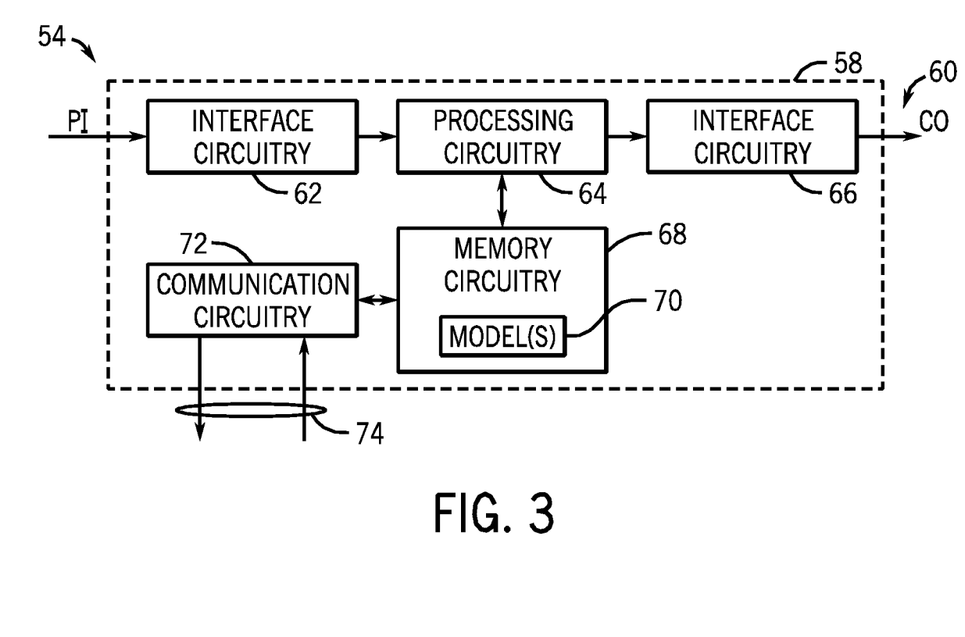
FIG. 3 is a diagrammatical representation of certain functional components which may be included in a controller of FIG. 2.

Referring now to FIG. 3, certain exemplary components that may be included in an MPC controller 58 of the type illustrated in FIG. 2 are illustrated. Many other components may be included, depending upon the system design, the type of system controlled, the system control needs, and so forth. In the embodiment illustrated in FIG. 3, the interface circuitry 62 receives process information which, as discussed above, may included the oxide composition data 54 derived by the sensors 22, the online analyzer 48, and the biasing circuit 52, in cooperation. In certain embodiments, the interface circuitry 62 may include filtering circuitry, analog-to-digital conversion circuitry, and so forth. The interface circuitry 62 is in data communication with the processing circuitry 64 which may include any suitable processor, such as a microprocessor, a field programmable gate array, and so forth. The processing circuitry 62 may carry out control functions, and in the present embodiment may perform model predictive control functions based upon knowledge of the cement process system 26. For instance, the processing circuitry 62 may execute one or more model predictive control algorithms to control the blending process such that the resulting cement product 44 meets one or more quality specifications (e.g., moduli targets). Such algorithms, as illustrated herein, may be defined by one or more control models 70 stored in a memory circuit 68 communicatively coupled to the processing circuitry 62. As mentioned above, an exemplary embodiment may utilize one or more models 70 configured to determine or derive one or more moduli values which may represent controlled variables (CV's) defining certain relationships between the C, S, A, and F oxides in the raw material feeds based on the oxide composition data 54. As will be discussed in further detail below, such calculations may be derived using an inferential model, such as a virtual sensor.

The memory circuit 68 may also include various control routines executed by the processing circuitry 62, as well as certain desired variables, variable settings, set points, and so forth. For example, the model(s) 70 may further include a dynamic predictive model which may receive the desired moduli set points 56 and, based on the values calculated for the CV's representing certain controlled moduli parameters, as discussed above, may implement control actions to the cement manufacturing process 26 in order to adjust the moduli CV's towards the desired set points 56. The processing circuitry 62, based upon the these control actions, may output signals to the interface circuitry 66 that may be used to drive the actuators 24 of a blending system 10, as discussed above with reference to FIG. 1. The interface circuitry 66 may include various driver circuits, amplification circuits, digital-to-analog conversion circuitry, and so forth. Thus, the control actions output by the controller 58, in accordance with the presently illustrated embodiment, may adjust the proportioning set points of the raw feed materials 14 in order to adjust the overall C, S, A, and F oxide compositions of the total raw feed in order to achieve the one or more target moduli set points 56.

Additionally, in certain embodiments, the controller 58 may further determine appropriate control actions or outputs based on the variable relationships, constraints, and/or objectives defined by the model(s) 70, which may include cost optimization factors and so forth. The controller 58 may further include communication interface circuitry 72 which may be configured to allow the controller 58 to communicate with other controllers that may be included within the control system 12, or other components within the blending system 26. By way of example, the communications interface circuitry 44 may include networking circuitry configured to network the controller 58 with other controllers, such as those controlling downstream processing of the blended product, or other components within the blending system 26.

Figure 4:
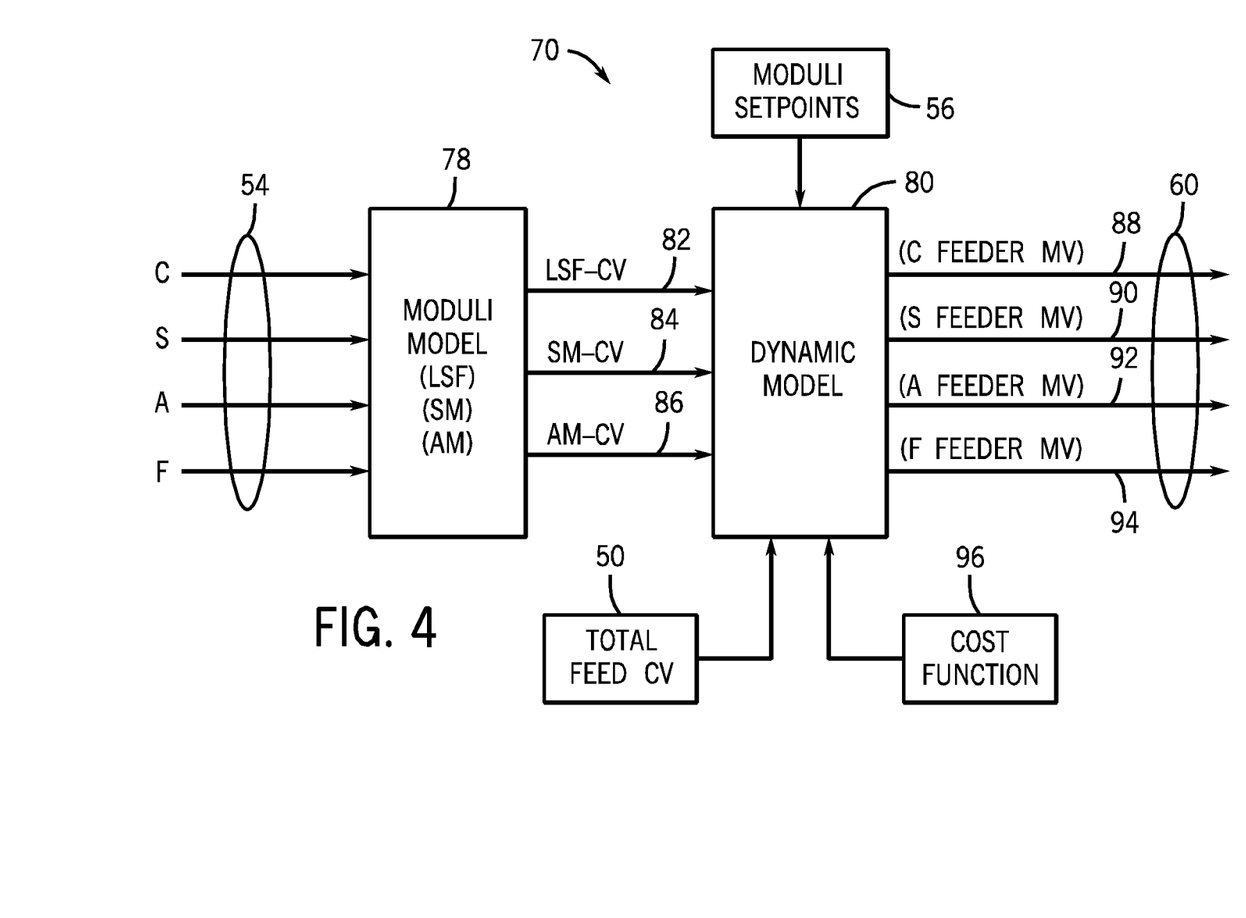
FIG. 4 is a diagrammatical representation of a dynamic model that may be implemented on a controller of the material blending system of FIG. 2 to control the material blending process.

Continuing now to FIG. 4, the diagrammatical representation of the control algorithms discussed above and generally represented in FIG. 3 by the one or more models 70 stored in the memory circuit 68 of the controller 58 is illustrated. As shown here, the control algorithm may include a first model 78 and a second model 80. The first model 78 may include an inferential model, such as a virtual sensor (e.g., VOA), configured to receive the C, S, A, and F oxide composition data 54 obtained from the cement blending system 26 and to derive or estimate the moduli control variable values. For instance, as illustrated by the present figure, the model 78 may be configured to derive a lime saturation factor (LSF) modulus 82, a silica modulus (SM) 84, and an alumina modulus (AM) 86. Before continuing with the present discussion, a brief summary of the cement product 44 properties that may be represented by each of the aforementioned moduli is provided.

As will be appreciated by those skilled in the art, the LSF modulus may be representative of whether the amount of C (calcium oxide) is in a correct proportion relative to the other major oxides (S, A, and F). For instance, the higher the LSF value determined, the stronger the resulting cement product 44 may be. However, as LSF increases, the energy required to effectively heat the raw mix to produce the clinker may also increase. Thus, a desired LSF value may be selected to produce a cement product 44 that meets strength specifications in view of the available or desired energy costs. By way of example only, one formula for deriving an LSF modulus value is provided below:

$$LSF = \frac{CaO}{(SiO_2 \times 2.8) + (Al_2O_3 \times 2.8) + (Fe_2O_3 \times 0.65)},$$

wherein CaO (C) represents a calcium oxide component, $SiO_2$ (S) represents a silicon oxide component, $Al_2O_3$ (A) represents an aluminum oxide component, and $Fe_2O_3$ (F) represents an iron oxide component. In practice, the resulting LSF value may be multiplied by 100 to obtain a percentage value. In modern clinker compositions, LSF values may typically fall within a range of 92% to 98%. By way of example a typical desired raw mix LSF modulus value in the present implementation may be within the range of 97% to 100% and may take into consideration ash content if coal is used as a kiln fuel.

The SM modulus may be representative of whether the amount of S (silicon oxide) is in a correct proportion relative to the amount of A (aluminum oxide) and F (iron oxide). As can be appreciated, a higher SM value may result in the clinker being more difficult to burn, due to a smaller amount of low melting point materials being present as liquid flux. By way of example only, an SM modulus may be defined by the following equation:

$$SM = \frac{SiO_2}{(Al_2O_3 + Fe_2O_3)},$$

wherein $SiO_2$(S) represents a silicon oxide component, $Al_2O_3$ (A) represents an aluminum oxide component, and $Fe_2O_3$ represents an iron oxide component. In certain embodiments, the SM value may typically fall between 2.0 and 3.0, and a preferred SM value may be between 2.2 and 2.6.

The AM modulus may be representative of whether the amount of A (aluminum oxide) is in a correct proportion relative to the amount of F (iron oxide). Generally, a high AM value combined with a lower SM value may result in a fast setting cement product (e.g., 44). By way of example only, an AM modulus simply be defined a ratio of aluminum oxide to iron oxide:

$$AM = \frac{Al_2O_3}{Fe_2O_3}$$

In many Portland cement processes, the AM value usually falls within a range of 1 to 4. In the present implementation, a desriable range for the AM value may be between 1.5 and 2.5. Thus, in the presently illustrated embodiment in FIG. 4, the above relationships may be utilized by the model 78 in order to determine the LSF, SM, and AM values represented by the reference numbers 82, 84, and 86, respectively, based on the oxide composition data 54 received from the cement process system 26. As will be appreciated, the moduli model 78 may be an inferential model provided as a virtual sensor (e.g., VOA) and be implemented using parametric models, neural network models, or linear and non-linear models, for example. Further, while the examples provided herein describe the control of a blending process based upon moduli relationships, it should be understood that the present techniques may also be implemented based upon other types of material relationship parameter, such as phase relationships (e.g., Bogue phases, silicate phases) for example.

The LSF, SM, and AM moduli values determined by the moduli model 78 may represent CV's that may be provided to the dynamic predictive model 80. As discussed above, a dynamic predictive model may be implemented to generate control actions that may manipulate one or more aspects of a process in order to bring certain control variables to a particular desired set point or objective. Here, the dynamic predictive model 80 may evaluate the calculated moduli values 82, 84, and 86 with respect to the desired moduli set points 56 discussed above. As will be appreciated, the moduli set points 56 may reflect the desired LSF, SM, and AM values defining particular oxide relationships for producing a cement product 44 that conforms to a particular quality target. Additionally, in some implementations, the desired moduli set points 56 may include tolerable deviations or ranges that may still produce an acceptable product, such as the ranges mentioned above with reference to the LSF, SM, and AM formulas. Accordingly, if the LSF (82), SM (84), AM (86) moduli values derived using the moduli model 78 deviate from the desired LSF, SM, and AM set points 56 (which may include a tolerable range), the dynamic predictive model 80 may adjust the proportioning set points, which may be regarded as MV's with regard to the cement process 26, for the raw oxide-containing material feeds 14 in order to drive the LSF, SM, and AM controlled variables (e.g., 82, 84, 86) towards the desired moduli set points 56.

As shown here, the dynamic predictive model 80 may be configured to adjust one or more MV's corresponding to the proportioning set points for each of the C, S, A, and F oxide-containing material feeds, referred to here by the reference numerals 88, 90, 92, and 94, respectively. As will be understood, the manipulation of these MV's (88, 90, 92, and 94) may be reflected as the control actions 60 provided by the controller 58 to the blending system 26, which may provide for the adjustment of the proportioning of the raw material feeds 14. Further, it should be noted that in the present embodiment, the control of the proportioning set point MV's may be constrained by the total feed CV 50. That is, the presently illustrated blending control application may provide for the adjustment of proportioning set points for each of the material feeds, but may not provide for the adjustment of the feed rates of the transport mechanisms (e.g., 28, 30, 32, and 34) themselves. For instance, the total feed rate (e.g., the CV 50) to the raw mill 36 may be controlled by an operator and may depend on various factors, such as the filling level of the mill or the circulation load. The total feed rate 50 may also be calculated and manipulated by another separate MPC controller on the mill circuit. Thus, while the controller 58 may take into account individual feed rates in its calculations, the total summed output of an optimum proportioning of the raw material feeds may never exceed or be less than the total feed CV 50. In other words, the sum of the proportioning percentage set points determined by the dynamic predictive model 80 must total to 100%. The present technique may also take process time delays into account, such as time delays that may be imparted by the transport mechanisms (e.g., 28, 30, 32, and 34) and may also use a receding time horizon which may be defined according to the frequency of feedback analysis to the controller 58.

In one embodiment, the control of feed material proportions in a blending process may be configured to tolerate for certain deviations away from a moduli set point for a predetermined amount of time prior to implementing compensation control. For instance, in minerals handling facilities, feeder deviations may be quite common due to a variety of factors. For example, inclement weather (e.g., rain) may affect the moisture content of the raw feed materials and cause large and fluctuating deviations in the material compositions. Further, deviations in the granulometry of bulk feed materials may cause impairments to the process. One common problem that may occur is when the size of the rocks or minerals cause congestion upstream in the process and temporarily slow or stop the flow of a feed material. Thus, the dynamic predictive model 80 may be further configured to tolerate a noticeable deviation from a desired set point for a programmed time period and, thereafter, implement the control actions to compensate for such deviations. Further, where the deviation occurs for a significant amount of time, the control system 12 may further be configured to detect for such a condition and to implement an alarm mechanism where control may be terminated, such as where a physical obstruction or congestion upstream cannot be immediately remedied, or where one or more components of the blending system 26 have been manually stopped by an operator.

As discussed above, the control of a blending process may also take cost optimization factors into account such that the process not only produces a blended product that meets target quality requirements within the constraints of material availability and logistics, but also produces the blended product for the lowest possible cost. For example, as shown in FIG. 4, the dynamic predictive model 80 may further take one or more cost functions 96 defining various cost variables of the blending process 26 into account in generating the control outputs 88, 90, 92, 94 for adjusting the raw material feed proportioning set point MV's. For instance, based on the cost of each of the raw material feeds (e.g., C, S, A, F), the dynamic predictive model 80 may adjust the MV's 88, 90, 92, and 94 in order to maximize the proportioning set points of the cheaper materials and minimize the proportioning set points of the more expensive materials in order minimize the overall cost of the total material feed while maintaining the composition of the blended product in accordance with the moduli set points 56. That is, the cost optimization actions of the model 80 may be constrained by the need to maintain the moduli targets.

Additional embodiments of the present invention may also provide for the transport of two or more materials to the blending system using a single feeder. For instance, though not shown in the presently illustrated figures, certain plants may only have a limited number of feeders for delivering the required feed materials to a blending system. Thus, in such circumstances, two or more raw materials, which may or may not be pre-mixed, may be provided to the process using a single feeder. Accordingly, it should be understood that the compositions and costs of combined (but not pre-mixed) or the pre-mixed feed materials may be utilized in the same manner as individual raw feed materials.

The present technique may further provide for the ability to utilize more than one feeder for the transport of each raw material to the process system. For example, where a process system includes more feeders than the number of raw materials to be transported, the extra feeders may be utilized in transporting one or more raw materials where necessary. For instance, if a particular feeder transporting one raw material goes offline (e.g., due to mechanical failure) during the blending process, the transport of the raw material may be diverted to another feeder that is presently unused. Additionally, the raw material previously transported by the offline feeder may also be diverted to another feeder that is presently transporting another raw material. That is, the feeder to which the raw material from the offline feeder is diverted may now transport two or more materials, as discussed above. Thus, as will be appreciated, the control system 12 may incorporate a mechanism which tracks the type of raw material or materials being transported by the feeders (e.g., 28, 30, 32, 34) of the process system. Based on this information the control actions output to the process may adjust the necessary feeder or feeders in order to control the quality of the blended product, as discussed above. For instance, in a situation where a C oxide-containing material is being transported using multiple feeders and the control system 12 determines that the proportion of the C oxide in the blend must be increased to maintain quality targets, the resulting control actions (e.g., 60) may ultimately result in the adjustment of each feeder presently providing the C oxide containing material to increase the amount of C oxide in the mix. The material transport information corresponding to each feeder of the process may be provided to the controller either manually via operator inputs, or automatically using the results of the online analyzer analysis, for instance. In certain implementations the raw material chemical analysis information detailing the composition of each raw material and material routing information detailing which materials are being fed on which feeder or feeders (e.g., 28, 30, 32, and 34) may be provided to the control system 12 in the form of data tables, such as a material analysis table detailing the chemical compositions of each raw material and a material routing table detailing the particular materials being transported by each feeder. Thus, if the transport mechanism for a particular material is changed or altered during the process (e.g., by an operator), these data tables may be updated and provided to the control system 106 such that the controller may output the determined proportioning set points to the proper feeder or feeders.

Still further, the controller 58, in accordance with a further embodiment, may also be configured to provide for offline simulation testing. For instance, the controller 58 may allow the user to input compositional data of the raw materials, moisture contents, a proposed proportioning (e.g., in percentages) of the raw materials, the price of the material, and feeder constraints to calculate the effect on the composition of the output product (e.g., cement product 44) and the cost for producing the product based on the entered inputs. Accordingly, this may allow operators, quality assurance personnel, and engineers to generate offline solutions which may then be used as a base line in implementing the blending process.

Figure 5:
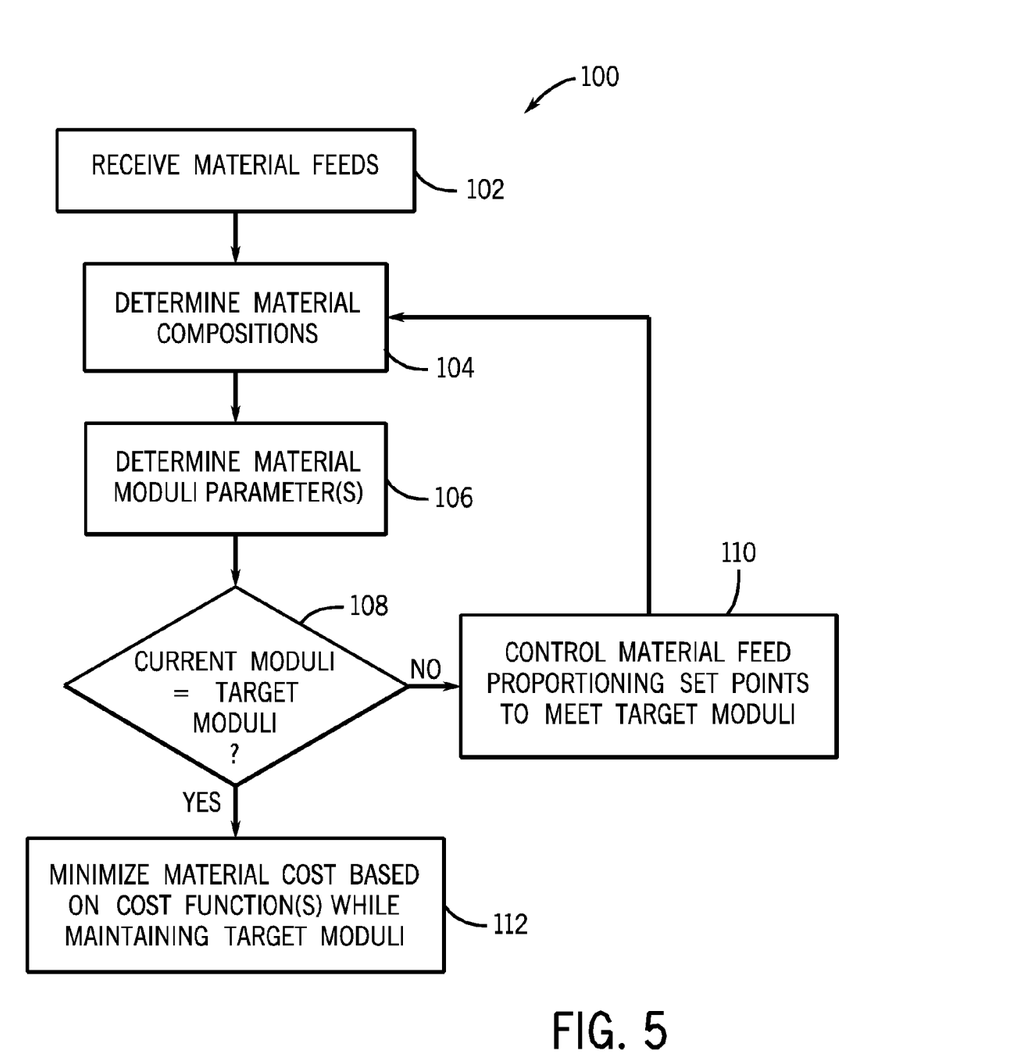
FIG. 5 illustrates exemplary logic for controlling a material blending process in accordance with the present techniques.

FIG. 5 illustrates exemplary logic 100 for carrying out the control of a material blending process based on the model predictive control techniques generally described in FIG. 4. The logic 100 may be implemented by the processing circuitry 64 discussed above with reference to FIG. 3. Further, although the logic 100 will be described below with reference to the cement blending system 26 of FIG. 2, it should be appreciated that the techniques set forth in FIG. 5 may be applicable to a variety of material blending applications, as discussed above. The logic 100, beginning with step 102, includes first receiving raw material feeds. For instance, as discussed above in FIG. 2, the raw material feeds may include the C, S, A, and F oxide containing materials which are fed to the blending system 26 by way of the transport mechanisms represented by the reference numerals 28, 30, 32, and 34. Next, at step 104, the particular compositions of the raw materials may be determined. As discussed above, the raw material feeds may be composed of a variety of materials. For example, in the cement blending process 26 of FIG. 2, each of the raw material feeds may provide a raw material having a dominant oxide required for the manufacturing of cement. Thus, the logic 100 may provide for determining or deriving the composition of the required oxide relative to other components in the raw material feed. As discussed above, the oxide composition information may be determined by using an online analyzer 48 in conjunction with the one or more sensors 22 or from physical samples of blended material analyzed in a laboratory.

Once the compositions of each required oxide from each of the raw material is determined, one or more moduli values defining particular relationships and ratios with regard to the proportion of the oxides may be determined at step 106. For instance, with regard to the cement blending system 26, an LSF, AM, and SM control variable value may be derived using the moduli model 78 based upon the oxide compositions determined in step 104. Accordingly, the determined moduli values may then be evaluated with regard to corresponding desired moduli set points (e.g., 56) for each of the LSF, AM, and SM values, as indicated by the decision step 108. If one or more of the calculated moduli values deviates from its corresponding set point, then control actions, represented by step 110, may be implemented (e.g., using the dynamic predictive model 80) to adjust the proportioning set points of the raw material feeds in order to bring the LSF, AM, and SM control variables towards the target set points. As shown here, the logic 100 may then return to step 104 to determine the material compositions and recalculate the LSF, AM, and SM control variables based upon the control actions performed in step 110.

Returning to step 108, if it is determined that the calculated moduli control variables (LSF, SM, AM) meet the desired moduli targets, then the logic 100 may proceed to step 112. As discussed above, certain embodiments of the present invention may further utilize cost optimization factors in the material blending process in order to produce a quality product for the lowest possible cost. For example, in determining the proportioning set points for the raw material feeds, the dynamic predictive model 80 may attempt to maximize the proportions of the least expensive materials and minimize the proportions of the more expensive materials, provided that the target moduli set points may be maintained.

While the above techniques have been described primarily with reference to the cement blending process 26 depicted in FIG. 2, it should be understood that the present invention is not intended to be limited in this regard. Indeed, the presently described techniques for controlling a material blending process may be applicable to a number processes, such as coal blending, mineral blending, and liquid blending applications. Further, the techniques described herein may be implemented in any suitable manner, including hardware-based circuitry or a computer program having executable code stored on one or more tangible computer-readable media. The techniques described herein may also be implemented using a combination of both hardware and software elements, as will be appreciated by those skilled in the art.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling operation of a blending system configured to process a plurality of raw materials to produce a blended product, comprising:
supplying, using a first raw material feeder, a first raw material of the plurality of raw materials into the blending system;
determining, using an online analyzer, a first material composition of the first raw material based at least in part on first sensor measurements determined while the first raw material is being supplied into the blending system via the first raw material feeder and before the blending system processes the first raw material;
determining, using a control system, a first moduli parameter configured to facilitate indicating expected properties of the blended product based at least on the first material composition;
performing, using the control system, a first comparison between the first moduli parameter and a corresponding first set point value configured to facilitate indicating target properties of the blended product; and
instructing, using the control system, the first raw material feeder to adjust supply of the first raw material into the blending system based at least in part on the first comparison.

2. The method of claim 1, comprising:
supplying, using a second raw material feeder, a second raw material into the blending system;
determining, using the online analyzer, a second material composition of the second raw material based at least in part on second sensor measurements determined while the second raw material is being supplied to the blending system via the second raw material feeder;
determining, using the control system, the first moduli parameter based at least in part on the second material composition; and
instructing, using the control system, the second raw material feeder to adjust supply of the second raw material into the blending system based at least in on the first comparison.

3. The method of claim 2, comprising:
supplying, using a third raw material feeder, a third raw material into the blending system;
determining, using the online analyzer, a third material composition of the third raw material based at least in part on third sensor measurements determined while the third raw material is being supplied to the blending system via the third material feeder;
supplying, using a fourth raw material feeder, a fourth raw material into the blending system;
determining, using the online analyzer, a fourth material composition of the fourth raw material based at least in part on fourth sensor measurements determined while the fourth raw material is being supplied to blending system via the fourth raw material feeder;
determining, using the control system, the first moduli parameter based at least in part on the third material composition and the fourth material composition; and
instructing, using the control system, the third raw material feeder to adjust supply of the third raw material into the blending system, the fourth raw material feeder to adjust supply of the fourth raw material into the blending system, or both based at least in on the first comparison.

4. The method of claim 3, comprising:
determining, using the control system, a second moduli parameter configured to facilitate indicating the expected properties of the blended product based at least in part on the first material composition, the second material composition, the third material composition, the fourth material composition, or any combination thereof, wherein the second moduli parameter comprises a silica modulus and the first moduli parameter comprises a lime saturation factor modulus;
determining, using the control system, a third moduli parameter configured to facilitate indicating the expected properties of the blended product based at least in part on the first material composition, the second material composition, the third material composition, the fourth material composition, or any combination thereof, wherein the third moduli parameter comprises a alumina modulus;
determining, using the control system, a second comparison between the second moduli parameter to a corresponding second set point value configured to facilitate indicating the target properties of the blended product;
determining, using the control system, a third comparison between the third moduli parameter to a corresponding third set point value configured to facilitate indicating the target properties of the blended product; and
instructing, using the control system, the first raw material feeder to adjust supply of the first raw material into the blending system, the second raw material feeder to adjust supply of the second raw material into the blending system, the third raw material feeder to adjust supply of the third raw material into the blending system, the fourth raw material feeder to adjust supply of the fourth raw material into the blending system, or any combination thereof based at least in part on the first comparison, the second comparison, third comparison, or any combination thereof.

5. The method of claim 1, comprising:
determining, using the control system, a second moduli parameter configured to facilitate indicating the expected properties of the blended product based at least in part on the first material composition;
determining, using the control system, a second comparison between the second moduli parameter with a corresponding second set point value configured to facilitate indicating target properties of the blended product; and
instructing, using the control system, the first raw material feeder to adjust supply of the first raw material into the blending system based at least in part on the second comparison.

6. The method of claim 1, wherein:
determining the first moduli parameter comprises inputting the first material composition to a moduli model, wherein the moduli model comprises an inferential model configured to describe relationship between at least the first material composition and the first moduli parameter; and
instructing the first raw material feeder to adjust supply of the first raw material comprises:
determining magnitude of deviation of the first moduli parameter from the first set point value;
determining a control action expected to reduce the deviation using a dynamic model configured to model operation of the blending system; and
instructing the first raw material feeder to implement the control action.

7. The method of claim 1, comprising adjusting the first set point value based at least in part on a cost optimization function to facilitate maintaining quality of the blended product at the target properties while reducing cost of producing the blended product.

8. The method of claim 1, wherein:
the first material composition changes over time as the first raw material feeder supplies the first raw material to the blending system; and
the first sensor measurements are determined before blending the first raw material with any other raw materials of the plurality of raw materials.

9. The method of claim 1, wherein:
the blended product comprises a blended cement product; and
the first raw material comprises calcium oxide, silicon oxide, aluminum oxide, iron oxide, or any combination thereof and impurities.

10. The method of claim 1, comprising:
determining, using the online analyzer, a second material composition of the first raw material based at least in part on second sensor measurements determined while the first raw material is being supplied to the blending system via the first raw material feeder; and
updating, using the control system, the first moduli parameter based at least in part on the second material composition.

11. The method of claim 1, wherein the first moduli parameter comprises a lime saturation factor modulus, a silica modulus, or an alumina modulus.

12. The method of claim 1, comprising:
determining, using the control system, a duration the first moduli parameter deviates from the first set point value; and
instructing the first raw material feeder to adjust supply of the first raw material only after the duration exceeds a predetermined duration.

13. The method of claim 1, comprising:
producing, using the blending system, a combined stream by blending the first raw material with other raw materials of the plurality of raw materials;
determining, using the online analyzer, a second material composition of the combined stream; and
biasing, using biasing circuitry, the first material composition based at least in part on the second material composition before determining the first moduli parameter.

14. A tangible, non-transitory, computer readable medium configured to store instructions executable by a processor of a blending system configured to process a plurality of raw materials to produce a blended product, wherein the instructions comprise instructions to:
instruct, using the processor, a first raw material feeder to supply a first raw material of the plurality of raw materials into the blending system;
receive, using the processor, a first material composition of the first raw material determined based at least in part on first sensor measurements determined while the first raw material is being supplied into the blending system via the first raw material feeder and before the blending system processes the first raw material;
determine, using the processor, a moduli parameter based at least on the first material composition;
perform, using the processor, a first comparison between the moduli parameter and a corresponding set point value configured to facilitate indicating target properties of the blended product; and
instruct, using the processor, the raw material feeder to adjust supply of the first raw material into the blending system based at least in part on the first comparison.

15. The computer readable medium of claim 14, comprising instruction to:
receive, using the processor, a second material composition of the first raw material based at least in part on second sensor measurements determined while the first raw material is being supplied to the blending system via the first raw material feeder and before the first raw material is blended with a second raw material of the plurality of raw materials, wherein the second material composition is different from the first material composition; and
determine, using the processor, the moduli parameter based at least in part on the second material composition.

16. The computer readable medium of claim 14, comprising instruction to:
determine, using the processor, a duration the moduli parameter deviates from the set point value; and
instruct, using the processor, the raw material feeder to adjust supply of the first raw material only after the duration exceeds a threshold duration.

17. The computer readable medium of claim 14, wherein the first material composition is biased based at least in part on a second material composition of a combined stream of the plurality of raw materials in the blending system before being used to determine the moduli parameter.

18. The computer readable medium of claim 14, wherein:
the instructions to determine the moduli parameter comprise instructions to:

determine a moduli model comprising an inferential model configured to describe relationship between at least the first material composition and the moduli parameter; and input the first material composition to the moduli model; and the instructions to instruct the raw material feeder to adjust supply of the first raw material comprises instructions to:

determine magnitude of deviation of the moduli parameter from the set point value;

determine a dynamic predictive model configured to model operation of the blending system;

determine a control action expected to reduce the deviation based at least in part on the dynamic predictive model; and instruct the raw material feeder to implement the control action.

19. The computer readable medium of claim 14, wherein the moduli parameter comprises a lime saturation factor modulus, a silica modulus, or an alumina modulus.

20. A blending system configured to process a plurality of raw materials to produce a blended product, comprising:

a raw material feeder configured to supply a first raw material of the plurality of raw materials into the blending system;

one or more sensors configured to perform first measurements on the first raw material while the first raw material is being supplied into the blending system via the raw material feeder and before the blending system processes the first raw material; and an online analyzer configured to determine a first material composition of the first raw material based at least in part on the first measurements; and a process controller configured to:

determine a moduli parameter configured to facilitate indicating expected properties of the blended product based at least in part on the first material composition;

perform a first comparison between the moduli parameter and a corresponding set point value configured to facilitate indicating target properties of the blended product; and instruct the raw material feeder to adjust supply of the first raw material into the blending system based at least in part on the first comparison.

21. The blending system of claim 20, wherein:

the one or more sensors are configured to perform second measurements on the first raw material while the first raw material is being supplied into the blending system via the raw material feeder and before the first raw material is blended with a second raw material of the plurality of raw materials; and the online analyzer is configured to determine a second material composition of the first raw material based at least in part on the second measurements, wherein material composition of the first raw material changes over time; and the process controller configured to update the moduli parameter based at least in part on the second material composition.

22. The blending system of claim 20, comprising a bias circuit configured to bias the first material composition based at least in part on a second material composition of the blended product;

wherein the blending system is configured to produce the blended produce by blending the first raw material with each of other raw materials of the plurality of raw materials;

the online analyzer is configured to determine the second material composition.

23. The blending system of claim 20, wherein the process controller is configured to:

determine a duration the moduli parameter deviates from the set point value; and instruct the raw material feeder to adjust supply of the first raw material only after the duration exceeds a predetermined duration.

24. The blending system of claim 20, wherein the process controller is configured to:

store a moduli model comprising an inferential model configured to describe relationship between at least the first material composition and the moduli parameter;

determine the moduli parameter by inputting the first measurements to the moduli model;

store a dynamic model configured to model operation of the blending system; and determine a control action expected to reduce deviation between the moduli parameter and the set point value based at least in part on the dynamic model; and instruct the raw material feeder to implement the control action to adjust the supply of the first raw material into the blending system.

25. The blending system of claim 20, wherein the process controller is configured to adjust the set point value based at least in part on a cost optimization function to facilitate maintain quality of the blended product at the target properties while reducing cost of producing the blending product.

26. The blending system of claim 20, comprising:

a raw mill unit fluidly coupled to the raw material feeder, wherein the raw mill unit is configured to grind the plurality of raw materials into a raw mix;

a raw mix silo fluidly coupled to the raw mill unit, wherein the raw mix silo is configured to store the raw mix;

a kiln fluidly coupled to the raw mix silo, wherein the kiln is configured to cause a chemical reaction in the raw mix to produce cement clinker; and a clinker silo fluidly coupled to the kiln, wherein the clinker silo is configured to store the cement clinker;

wherein the blending system is configured to process the cement clinker to produce the blended product and the raw material feeder comprises a conveyer, a belt, or both.

27. The blending system of claim 20, wherein the process controller comprises a model predictive controller.

28. The blending system of claim 20, wherein the blending system comprises a concrete blending system.

* * * * *